United States Patent [19]

Roll

[11] Patent Number: 4,567,975

[45] Date of Patent: Feb. 4, 1986

[54] APPARATUS AND METHOD FOR CONTROLLING THE ENGAGEMENT OF A GAP-TYPE ELECTROMAGNETIC COUPLING AND FOR ALLEVIATING ENGAGEMENT NOISE

[75] Inventor: Thomas P. Roll, Janesville, Wis.

[73] Assignee: Warner Electric Brake & Clutch Co., South Beloit, Ill.

[21] Appl. No.: 581,279

[22] Filed: Feb. 17, 1984

[51] Int. Cl.$^4$ ............................................. F16D 27/00
[52] U.S. Cl. ................................ 192/84 C; 192/30 V; 192/52; 361/154
[58] Field of Search ................. 192/84 C, 84 R, 84 B, 192/30 V, 52; 361/152, 154

[56] References Cited

U.S. PATENT DOCUMENTS

| | | |
|---|---|---|
| 2,808,917 | 10/1957 | Harter . |
| 3,712,439 | 1/1973 | Schacher et al. ................ 192/84 C |
| 4,160,498 | 1/1979 | Newton et al. .................. 192/84 C |
| 4,376,476 | 3/1983 | Hagiri ................................. 361/154 |
| 4,377,223 | 3/1983 | Sakakiyama et al. ............ 192/84 R |
| 4,473,862 | 9/1984 | Hill ..................................... 361/154 |
| 4,509,091 | 4/1985 | Booth ................................. 192/3.56 |

OTHER PUBLICATIONS

Engineering Blue Print No. 750–0074, issued Mar. 15, 1979 by Warner Electric Brake and Clutch Company, Beloit, Wis.

Primary Examiner—Rodney H. Bonck
Assistant Examiner—Alan G. Towner
Attorney, Agent, or Firm—Leydig, Voit & Mayer, Ltd.

[57] ABSTRACT

An apparatus and method is provided for energizing a multiple-turn winding of an electromagnetic coupling having an armature and a rotor separated by an air gap; in response to the closure of the air gap, the energization of the winding is reduced so as to reduce the torque coupling between the armature and rotor. By reducing the initial torque coupling between the armature and rotor the frictional vibrations of the coupling—which occur during engagement of the armature and rotor and which generate audible noise—are reduced and the coupling engages more smoothly and quietly. Preferably, the energization of the winding is reduced in response to the increased magnetic inductance of the winding resulting from the closure of the air gap between the armature and rotor. Also, the torque coupling between the armature and rotor is preferably minimized in response to the increased magnetic inductance so as to provide 100% slippage upon initial contact of the rotor with the armature. From the reduced energization of the winding occurring after the closure of the air gap, the energization of the winding is controlled to gradually increase to full torque coupling and 0% slippage. To further reduce the audible noise upon engagement of the armature and rotor, the flux gaps in both the armature and rotor are composed of non-magnetic areas which are asymmetrically positioned in the magnetic material comprising the armature and rotor. By asymmetrically positioning the non-magnetic areas, the audible noise from the vibrations of the armature and rotor is reduced; the vibrations are caused by the frictional slippage between the armature and rotor upon their initial engagement.

38 Claims, 12 Drawing Figures

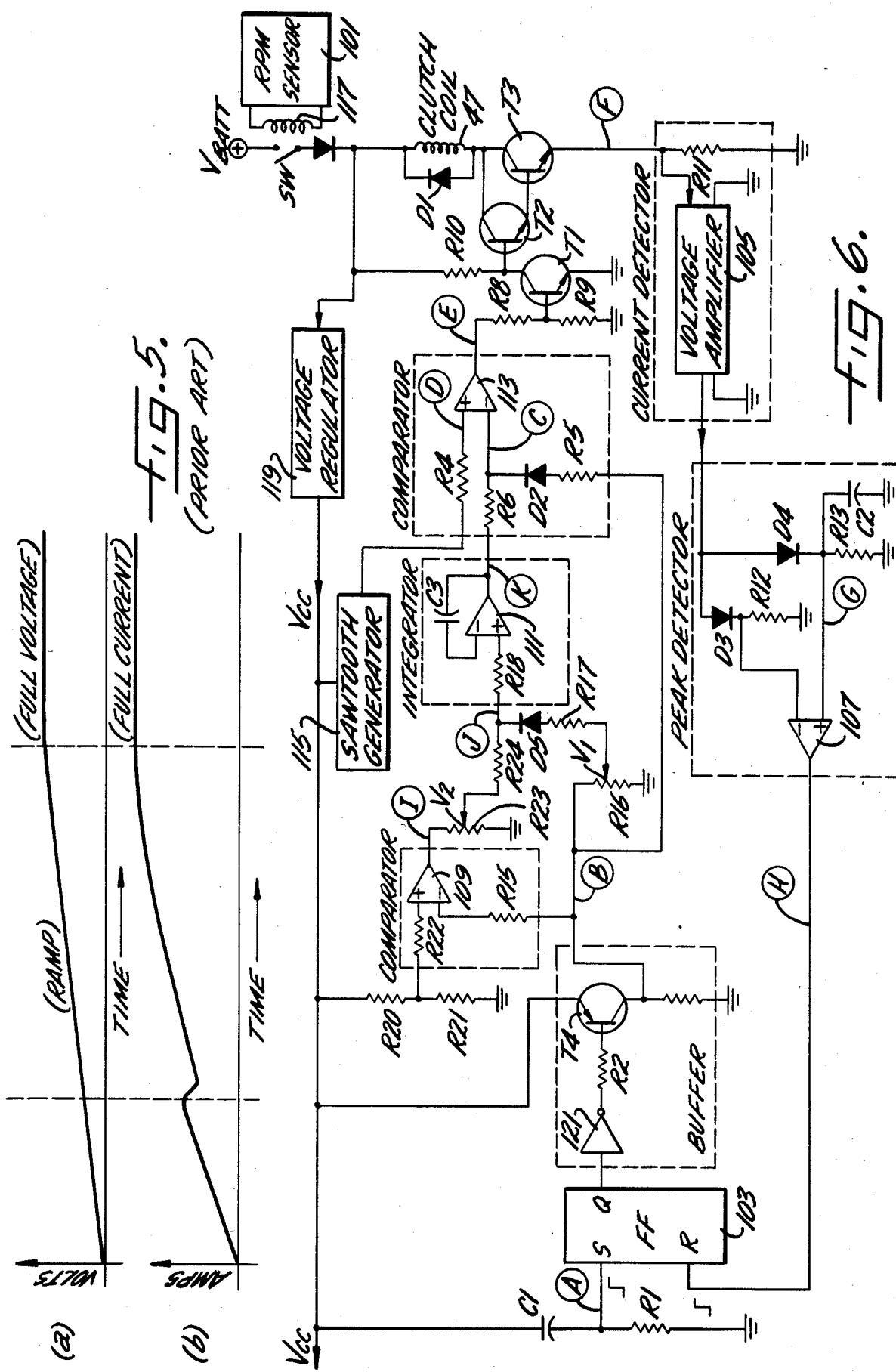

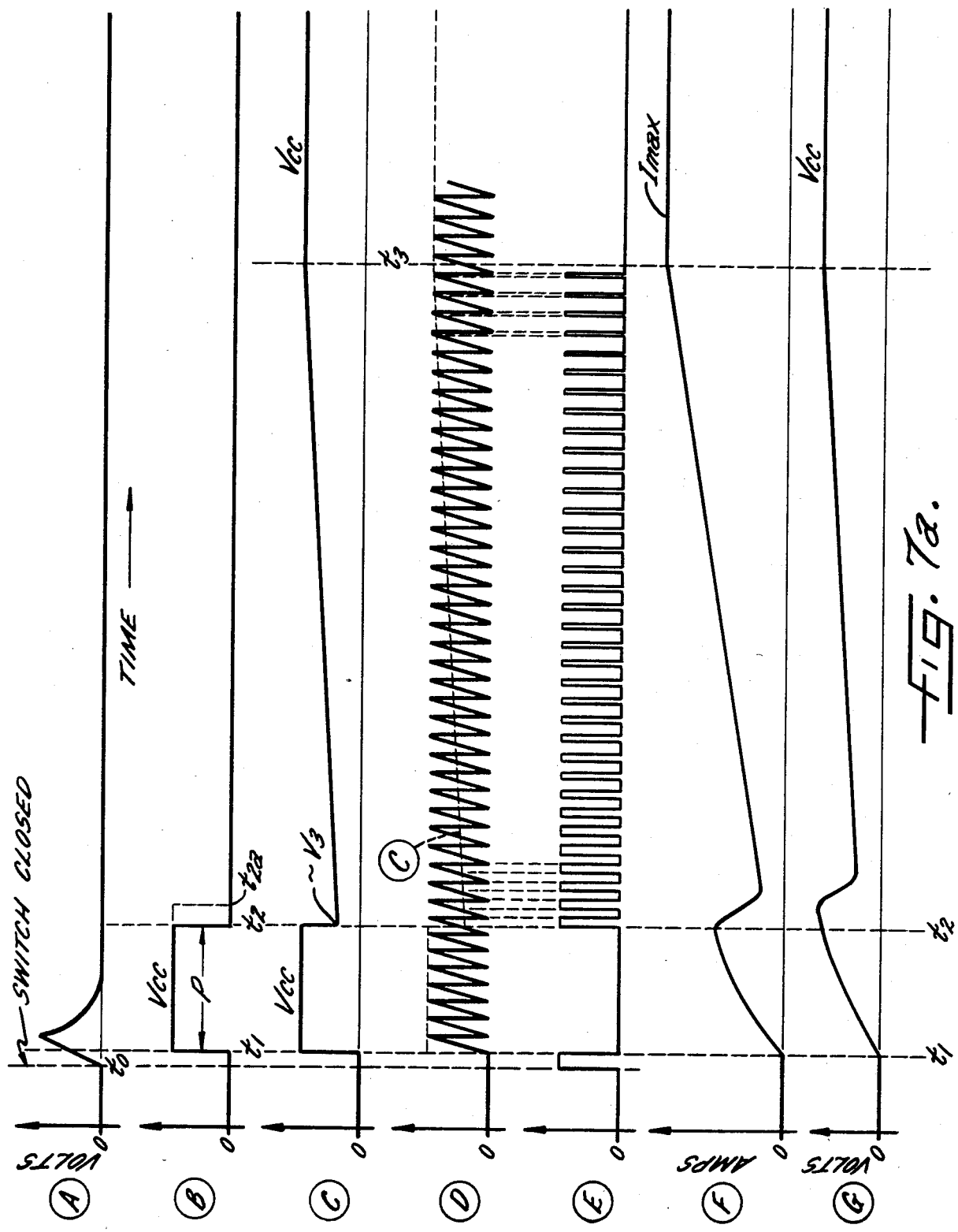

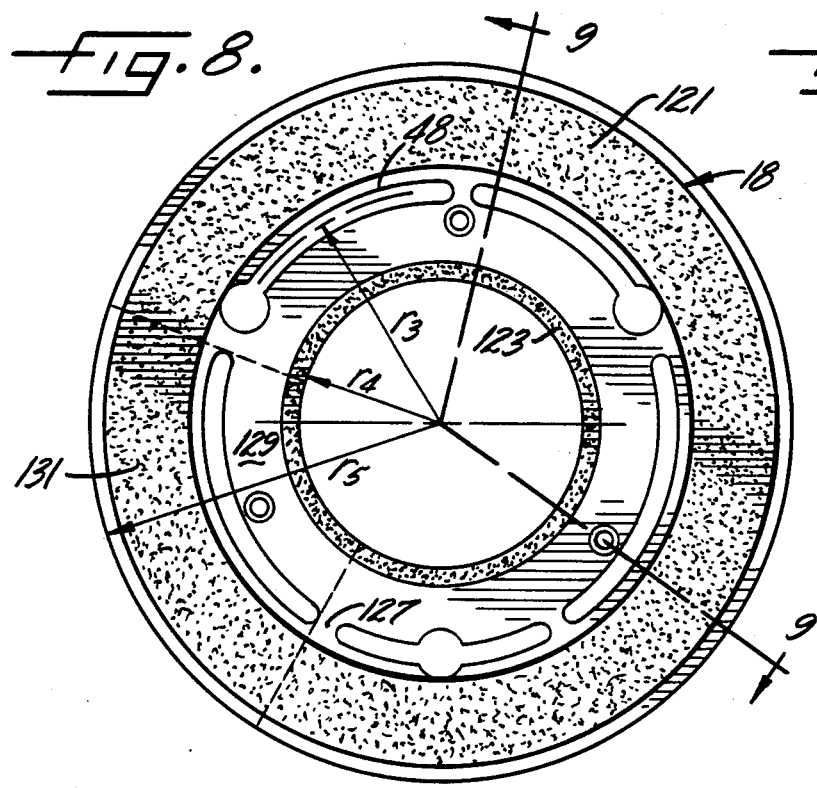
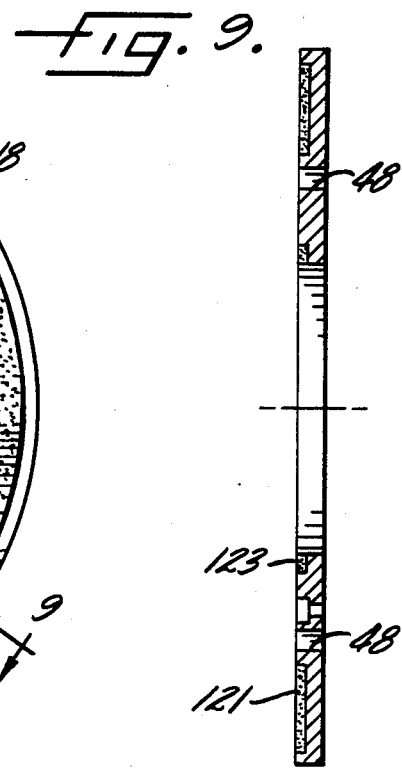
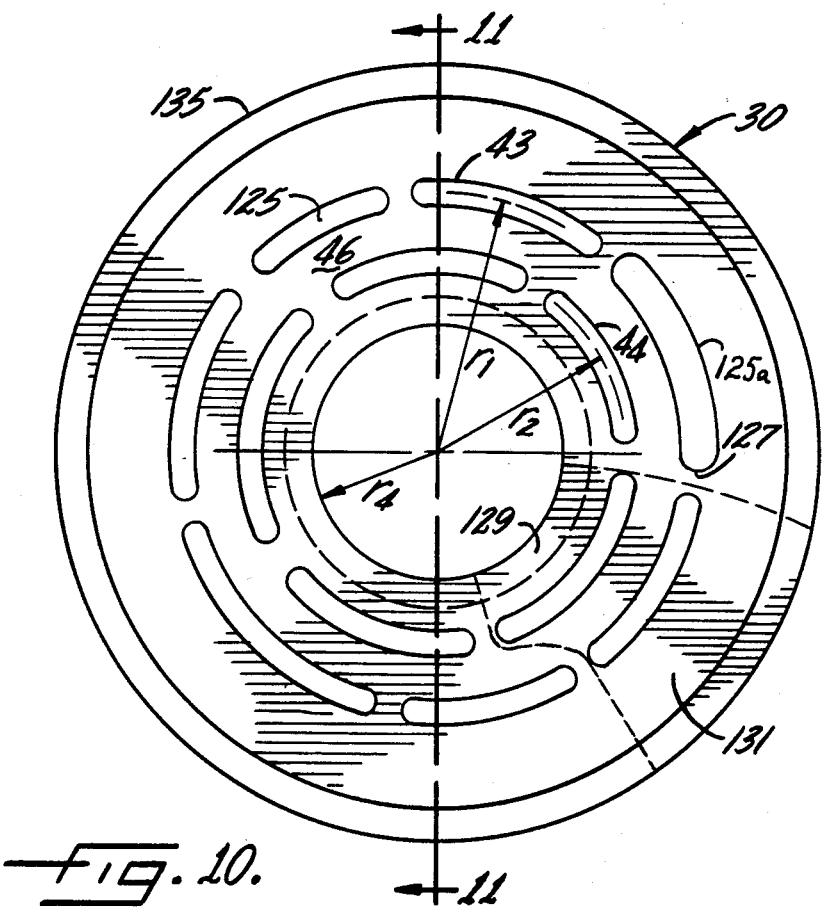
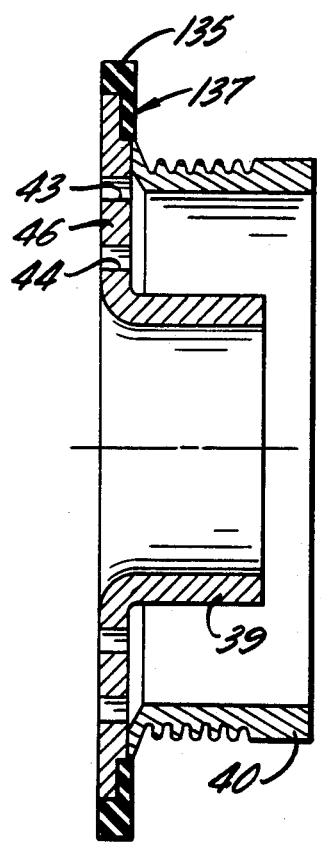

APPARATUS AND METHOD FOR CONTROLLING THE ENGAGEMENT OF A GAP-TYPE ELECTROMAGNETIC COUPLING AND FOR ALLEVIATING ENGAGEMENT NOISE

FIELD OF THE INVENTION

The invention generally relates to methods and apparatus for controlling the excitation and engagement of electromagnetic couplings. More particularly, the invention has to do with controlled excitation of electromagnetic clutches or brakes of the type having two relatively rotatable members separated by an air gap, the engagement of the members being accomplished without undue noise or mechanical shock despite changes in the gap length due to wear on the two members.

BACKGROUND OF THE INVENTION

In some commonly known electromagnetic clutches having a stationary magnetic core, a rotor and a relatively rotatable armature, an air gap separates the rotor from the armature when the electromagnet is de-energized. The armature is held away from the rotor by means of leaf springs secured to a pulley assembly which, in turn, is keyed to the shaft about which the clutch rotates. A multiple-turn winding (i.e., clutch coil) is disposed between the magnetic core and the rotor and, when energized, produces magnetic flux which threads a path through the magnetic core, the rotor and the air gap to the armature whereby the armature is drawn toward the rotor. By way of this flux coupling, the armature is moved to close the gap and engage the rotor so the two are coupled by friction and one drives the other without slippage. The coupling torque between the rotor and the armature is dependent in part upon the m.m.f. produced by the coil and the magnetic flux threading the interface between the rotor and the armature.

Typically, when full or rated voltage is applied to an initially de-energized clutch coil (i.e., a step voltage), the current rises exponentially due to the inductance of the coil. In a gap-type electromagnetic clutch, at a predetermined level of current the m.m.f. in the magnetic path becomes sufficient to pull the armature into contact with the rotor against the bias of the springs. At the instant of gap closure (i.e., touching of armature to rotor) the coil current and the m.m.f. may have almost reached the rated or maximum values, but the flux is still rising because the reluctance of the entire flux path falls dramatically as the gap narrows and closes. Because torque transmission between a touching rotor and armature is proportional to the flux crossing the interface, if rated voltage is applied at a first instance to the coil, the armature more or less slams into engagement with the rotor at a later second instant with a slight delay determined by coil inductance and mechanical inertia. But at the second instant, torque transmission between the rotor and armature virtually jumps from zero to the rated value.

Such a jump in torque may cause (i) an undesirably sudden loss in speed of the prime mover supplying input power to the clutch, (ii) undue shock or strain on driving on driven components, including belts or chains, or (iii) unpleasant engagement noise and belt screech. In addition, when the rotor and armature are engaged the inertia of the slower moving of the two (and its load) needs to be overcome before the full torque coupling locks the rotor and armature into synchronized rotation. After touching (i.e., initially after gap closure) and while the rotor's or armature's inertia is being overcome, frictional slippage occurs at the rotorarmature interface due to the existence of the maximum or rated magnetic attraction force; this latter condition often results in alternate slips and holds (i.e., chatter noise and undue wear). This alternating slip-hold vibrating engagement or chatter is sometimes evidenced by a loud audible vibration or "screeching" noise generated at the rotor-armature interface.

Some clutches and brakes have been associated with control units which produce a so-called "soft start" action. In these, the average coil current and the average m.m.f. are smoothly increased from zero to maximum or rated values. This works satisfactorily for clutches and brakes in which the armature and rotor are not separated by a gap, but instead relatively rub with light contact when the clutch is "disengaged". In this sort of arrangement, slippage gradually decreases, torque gradually increases and "chatter" does not occur. Mechanical shocks on a prime mover and associated components are alleviated when a gapless-type clutch or brake is excited with a smooth ramp to produce a "soft start".

Although a "soft-start" zero-gap clutch utilizing a ramp voltage is an improvement over a clutch initially energized by a step voltage, the problem remains that the ramp-voltage engagement technique when used in connection with a gap-type clutch produces a torque coupling upon initial engagement of the armature to the rotor. This initial torque coupling is sufficient to produce a "screeching" noise resulting from slip-hold vibration as the inertia of the slower moving rotor or armature is being overcome. The "screeching" noise is similar in nature to that resulting from energization of the clutch coil by a step voltage. Also, the sudden torque-coupling engagement of the rotor and armature produced by a ramp voltage energization of the clutch coil may still cause an undesirable change in engine RPM. Therefore there remains problems of noise and sudden load changes which cannot be eliminated for a gap-type clutch energized by only a ramp voltage according to the known soft-start technique. Specifically, when the ramp voltage and its associated current and flux density are great enough to create a force which draws the armature to the rotor they are greater than what is needed to merely hold the armature and rotor in contact and to allow maximum slippage and minimum slip-hold noise (i.e., high-pitched "screech"). Therefore, there is a near instantaneous torque coupling applied to the armature-rotor interface which is less than that associated with a step-voltage energization, but nevertheless sufficient to be characterized by the same problems.

In co-pending U.S. Pat. application Ser. No. 581,108, filed Feb. 17, 1984 by Dwight Booth, now U.S. Pat. No. 4,509,091, (and assigned to the assignee of the present application) the control unit pulses the clutch coil with full voltage for a predetermined time duration known to be sufficient to draw the armature across the gap and into contact with the rotor. At the conclusion of the full voltage pulse, the clutch coil is energized by ramping up the average coil current from an initial value which is affirmatively and markedly reduced from that produced by full voltage energization of the coil. By energizing the clutch coil in this manner the torque coupling at the instant of gap closure is reduced. Specifically, the reduced average current excitation following the full-voltage pulse is chosen so as to produce approximately zero torque coupling and 100% slip at the rotor-armature interface.

The present applicant has recognized a further problem which is encountered when one attempts to utilize the Booth control apparatus with gap-type clutches or brakes which are not, for reasons of economy, constructed with the "auto-gap" feature disclosed in U.S. Pat. Nos. 2,705,058 and 2,970,681 and by which the air gap between a disengaged rotor and armature is maintained, through mechanical compensation, essentially constant despite substantial wearing down of the opposed friction surface faces. In non-compensated gap-type magnetic clutches or brakes employed in such environments as automobile accessory drives or the like, the coupling is initially manufactured such that the opposed steel surfaces of the two principal members (e.g., rotor and armature) are separated by a gap of a chosen first width (e.g., 0.021") when fully disengaged; but as the coupling is cycled thousands of times over its normal useful life, the surface wears down considerably and the gap, when the surfaces are fully disengaged, will increase to a second, larger width (e.g., 0.200").

The air gap between an armature and rotor's faces in a magnetic clutch (or brake) forms the highest reluctance portion of the magnetic flux path, and a change of only a few thousandths of an inch in gap width can materially increase the reluctance of the complete flux path whose other portions are formed by permeable steel. Thus, a given magnetic coupling possesses a main gap which becomes wider in the later stages of its useful life than in its earlier stages, and a greater m.m.f. is required in the wider gap case to create sufficient flux to draw the armature across the gap and into contact with the rotor.

It has been the practice of the industry to make the source voltage and parameters of the coil excitation circuit for such clutches create sufficient coil current and m.m.f. to close the gap and engage the cooperating members even when the gap has the widest value to be encountered near the end of the coupling's useful life. But this means that the m.m.f. will really be more than required during the major portion of the coupling's useful life.

The above-identified co-pending application discloses a control procedure for an electromagnetic coupling by which the coil of the coupling is excited at full source voltage for a predetermined time interval which corresponds to that observed as required for the gap to close when one is controlling an electromagnetic coupling of a given design and size. Normally, one would choose an observed time interval near the end of the coupling's useful life; but if that choice is followed, then control of the same coupling when it is new (and the its gap is narrowest) would result in the full excitation of the coil for a significant time span after the gap has closed and before the predetermined time interval ends. Full excitation of the coil after gap closure can thus create alternate slip-and-hold chatter, with the same objectionable noise, mechanical shock and belt screech.

Finally, applicant has observed that when chatter is alleviated by a "soft start" procedure, it is not always wholly eliminated. But applicant has discovered supplemental structure modification which further reduce the intensity of objectionable noise generated by an electromagnetic coupling's main elements when they first come into contact.

SUMMARY OF THE INVENTION

It is a primary object of the present invention to provide a gap-type electromagnetic clutch or brake which reduces the noise and undue wear resulting from chatter upon energization of the clutch or brake coil—despite changes in the width of the opened gap. It is a related object of the present invention to provide an apparatus and method for energizing a gap-type electromagnetic clutch or brake which compensates for increases in the width of the opened gap between the rotor and armature resulting from clutch wear over the useful life of the clutch.

Another object is to provide a control method and apparatus for a gap-type electromagnetic clutch or brake which alleviates the audible screeching caused by the vibration of the rotor and armature upon energization of the clutch or brake, even though the open gap width may change in an unforseeable fashion.

It is a further object of the invention to reduce vibratory noise upon engagement of an electromagnetic coupling by reducing resonant frequency vibrations which tend to reinforce each other.

Still another object is to alleviate vibratory noise upon engagement of an electromagnetic coupling by structural additions which dampen the audible frequency vibrations.

Other objects and advantages of the invention will become apparent from the following detailed description and the accompanying drawings.

In accordance with the main feature of the present invention, a control unit is provided to energize and cause engagement of a gap-type electromagnetic coupling in the basic generic fashion disclosed and claimed in the above-identified application of Dwight Booth, but with a further improvement to prevent high torque and chatter immediately following contact of the two main members (rotor and armature) even if the width of the opened gap between such members has changed unforeseeably and the time required for gap closure correspondingly changes. This is accomplished by sensing means which sense and signal, at least approximately, the instant in time when the gap becomes fully closed, and by means which cause an abrupt reduction in the average coil excitation and the average m.m.f. in response to the signalling by said sensing means. Thus, there is no need to determine the gap closing time exhibited by a given clutch when initally excited at the chosen high average current and m.m.f. levels. Proper timing of the reduction in exciting current and m.m.f. is automatically achieved to assure that full excitation forces do not continue after the members touch. This assures that slip-and-hold chatter and noise are eliminated or alleviated even more reliably, and in the face of gap-width wear, than by the method and apparatus disclosed in the co-pending Booth application—because the predetermined time duration for the initial period of high m.m.f. excitation is not required or utilized.

BRIEF DESCRIPTION OF THE DRAWINGS

FIGS. 5(a) and 5(b) are voltage and current waveforms, respectively, for a prior art ramp-voltage energization of an electromagnetic coupling;

FIG. 6 is a schematic diagram of the clutch energization circuit according to one embodiment of the invention;

FIG. 8 is a plan view of the armature according to the invention for the two-speed accessory drive clutch;

FIG. 9 is a cross-sectional view of the armature in FIG. 8 taken along, the line 9—9;

FIG. 10 is a plan view of the rotor according to the invention for the two-speed accessory drive clutch; and FIG. 11 is a cross-sectional view of the rotor in FIG. 10 taken along the line 11—11.

While the invention will be described in some detail with reference to a preferred embodiment, it is to be understood that it is not intended to limit the invention to such detail. On the contrary, it is intended to cover all alternatives, modifications and equivalents which fall within the spirit and scope of the invention as defined by the appended claims.

DETAILED DESCRIPTION OF THE PREFERRED EMBODIMENT

Figure 1:
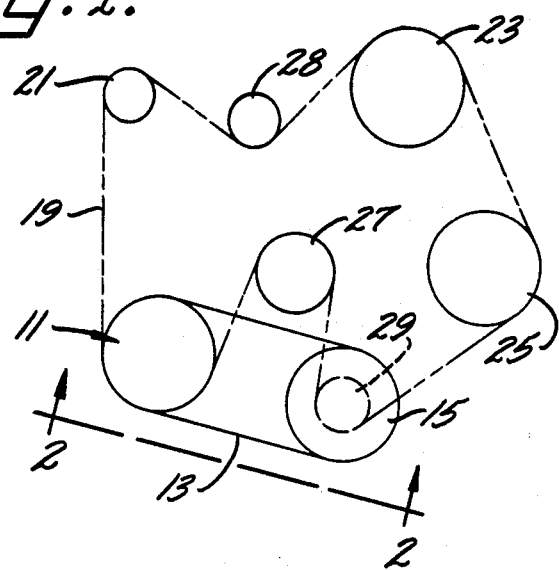
FIG. 1 is a schematic diagram of an accessory drive system for an engine-driven vehicle showing a clutch configuration which allows the accessories to be driven at two speeds.
Figure 2:
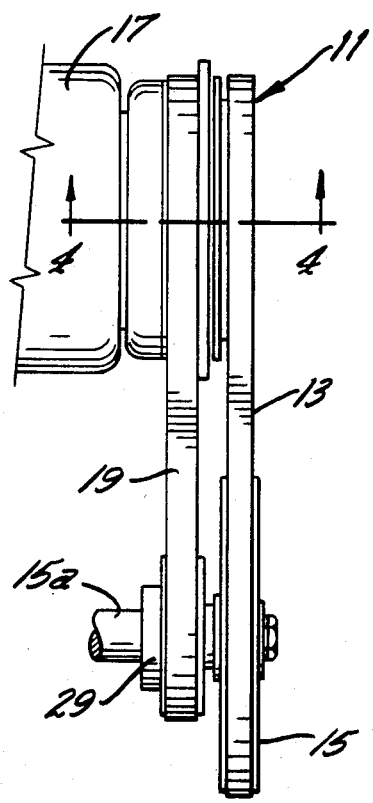
FIG. 2 is an enlarged side view of the accessory drive system in FIG. 1 taken along the line 2—2 showing the system's clutch and crankshaft pulleys.

Referring first to FIGS. 1 and 2, accessory drives in automobiles have traditionally utilized a direct-drive configuration with the accessories having a linear speed relation to engine crankshaft speed. In the direct-drive configuration, at high engine speeds the accessories are driven at rotational velocities considerably in excess of those actually required. With increasing concern in recent years about fuel-efficient operation of automobiles, two-speed accessory drives have been developed which in part eliminate excessive rotational speed of accessories. By reducing the speed of the accessories relative to engine speed in the high crankshaft speed range, increased miles-per-gallon performance by the automobile may be realized.

To implement a two-speed accessory drive, the armature side of a two-speed accessory drive clutch 11 (hereinafter TSAD clutch) is connected to the engine's crankshaft pulley 15 by an endless belt 13. The TSAD clutch 11 is mounted over the rotatable shaft 16 of an air pump 17. The circular armature 18 of the TSAD clutch is keyed to the air pump's shaft 16 by way of the armature's pulley. The air pump 17 is an emissions control device which must run at speeds linearly proportional to the engine's speed over the full range of engine speeds. Therefore, the TSAD clutch's circular armature 18 is keyed to the air pump's shaft 16, to provide a direct drive for the air pump 17 from the crankshaft pulley 15 by way of the TSAD clutch's armature 18 and endless belt 13.

In order to drive the automobile's accessories, a second endless belt 19 is trained around pulleys for an alternator 21, an air conditioner 23, a power steering pump 25 and a water pump and fan assembly 27. An idler pulley 28 aids in tensioning the endless belt 19. The endless belt 19 is also trained around a one-way or "overrun" clutch 29 mounted on the crankshaft 15a and the grooved pulley surface of an annular rotor 30 of TSAD clutch 11. Since both the one-way clutch 29 and crankshaft pulley 15 are mounted on an extension of the engine's crankshaft, the one-way clutch 29 is coaxial with the crankshaft pulley 15 but its pulley diameter is approximately one-half of that for the crankshaft pulley.

Figure 3:
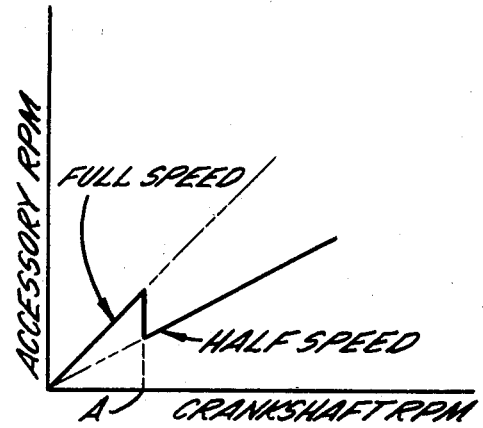
FIG. 3 is a graphic representation of the two speeds of the accessory drive system in relation to the speed of the engine's crankshaft.

In operation, when the engine is running at speeds below a preselected value A in FIG. 3, the TSAD clutch 11 is engaged so that the rotor 30 and the armature 18 are driven in unison by input from the belt 13. Since the diameter of the rotor 30 of the TSAD clutch is greater than the diameter of the one-way clutch 29, it follows that when the TSAD clutch is engaged, the belt 19 drives the outer component of the one-way clutch faster than the speed of the crankshaft. The one-way clutch is constructed, in known fashion, such that is outer component freely overruns its inner component and the crankshaft shaft 15a in these circumstances. By contrast, at crankshaft speeds greater than a value A, the TSAD clutch 11 is deenergized and the rotor 30 is disengaged from the armature 18. Now the speed of the rotor and the outer component of the one-way clutch 29 tend to be zero or less than crankshaft speed; but because the one-way clutch 29 "engages" it causes the belt 19 to drive the rotor 30 from the crankshaft 15a. Since the one-way clutch 29 has a smaller diameter than the crankshaft pulley 15, the ratio between the accessory and engine speeds are reduced upon de-energization of the TSAD clutch.

Figure 4:
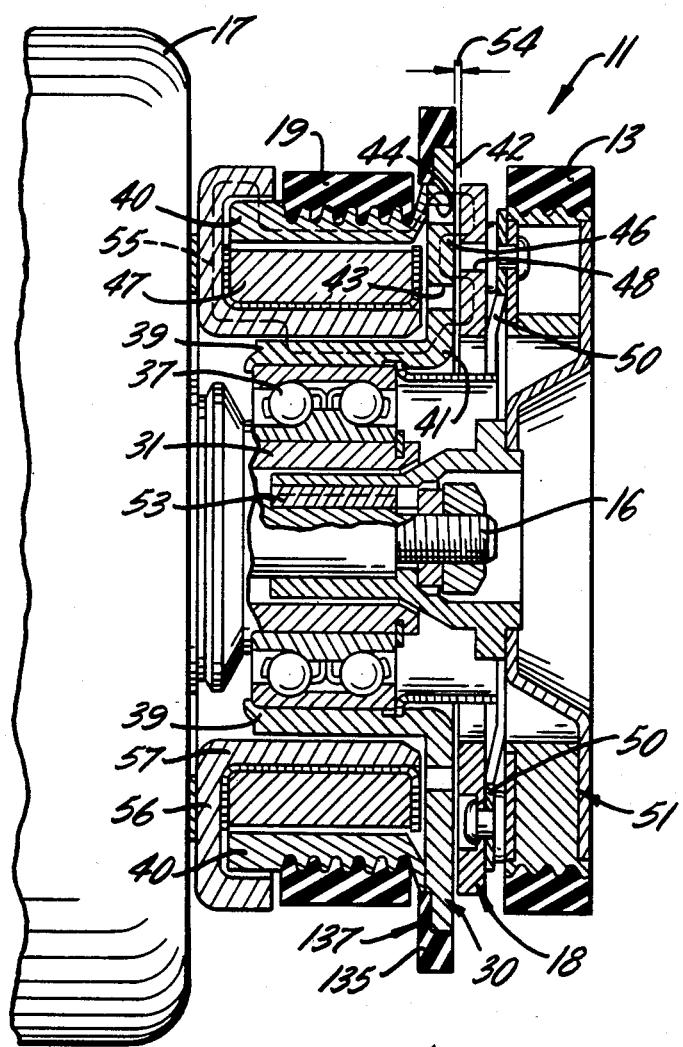
FIG. 4 is a cross-sectional view taken along the line 4—4 in FIG. 2 of the two-speed accessory drive clutch.

Referring now to FIG. 4, the TSAD clutch or electromagnetic coupling 11 is carried by a tubular nose 31 extending from the housing of the air pump 17 and concentric with the pump shaft 16. The engaging surfaces for the electromagnetic coupling are provided by first and second members 18 and 30, respectively (hereinafter armature 18 and rotor 30 of the TSAD clutch 11). The annular rotor 30 is rotatably journaled on the nose 31 by a ballbearing 37. The rotor 30 is substantially U-shaped in radial cross-section and includes inner and outer concentric pole rings 39 and 40 made of magnetic material, the inner ring being secured to the outer race of the bearing 37. It should be noted that the clutch shown in FIG. 4 is only exemplary of many different well-known electromagnetic couplings which may be utilized with the invention.

Circular pole faces 41 and 42 are defined by the forward ends of the rings 39 and 40, respectively. The pole faces 41 and 42 are magnetically isolated from one another by radially spaced flux gaps 43 and 44; each flux gap is composed of circumferentially spaced arcuate slots which will be described in greater detail in connection with FIG. 9. The two sets of slots are physically connected by an intervening ring 46.

A multiple-turn winding 47 (hereinafter referred to as the clutch coil) is stationary between the inner and outer pole rings 39 and 40 of the rotor 30, being fixed by epoxy on a J-shaped support 56 of ferromagnetic steel and suitably attached to the housing of the air pump 17. The support 56 defines an inner pole ring 57 closely spaced by a short radial air gap from the inner surface of the rotor 30. Because the magnetic support 56 does not totally surround the rotor 30, the endless drive belt 19 may be trained directly to the outer grooved surface of the rotor, thus allowing the rotor to function as a pulley.

When excited by a voltage source, the clutch coil 47 produces magnetic flux which engages the TSAD clutch 11 by drawing the armature 18 into engagement with the pole faces 41 and 42 of the rotor 30. The armature 18 is in the form of a circular disk having a flux gap 48 composed of a series of circumferentially spaced arcuate slots similar to those of the rotor's flux gaps 43 and 44. The slots comprising the flux gap 48 are more completely described in connection with FIG. 8.

In order to bias the armature 18 away from the rotor 30 when the clutch coil 47 is de-energized, the armature is connected to a pulley assembly 51 by a set of circumferentially spaced leaf springs 50. The pulley assembly 51 is keyed at 53 to the shaft 16 of the air pump 17 and is continuously driven via the belt 13 from the crankshaft pulley 15. The springs 50 urge the armature 18 to a position in which the armature is spaced from the pole faces 41 and 42 by a narrow axial air gap 54. Upon excitation of the clutch coil 47, magnetic flux threads along a path 55 indicated in dotted line. The slots of the rotor's flux gaps 43 and 44 and the slots of the armature's flux gap 48 direct the flux path to "zig-zag" back and forth across the armature-rotor axial air gap 54 according to a technique known in the art and disclosed in U.S. Pat. No. 4,160,498. Such a flux 55 causes the armature to be drawn into frictional engagement with the rotor's pole faces 41 and 42. This engagement couples the armature and the rotor for rotation in unison when the magnetic flux and the attractive force become great enough to eliminate slippage.

The flux produced by the clutch coil 47 is transferred between the coil 47 and the rotor 30 by way of the magnetic support 56 which, together with the rotor components 39 and 40, the gap 54 and the armature 18 constitute a magnetically permeable flux path structure through which flux threads (see dashed line 55) in response to the m.m.f. which is created by the clutch coil 47 when the latter carries exciting current.

Substantially at the same instant the armature has been drawn across the armature-rotor axial air gap 54 and into contact with the rotor, the current passing through the coil experiences a slight reduction as indicated by the dip in the current waveform in FIG. 5(b). This dip in the current waveform is a characteristic of all gap-type clutches. Specifically, since the total magnetic inductance of the clutch coil 47 is dependent on the nature of the flux path 55, the closing of the axial air gap 54 by movement of the armature 18 into contact with the rotor 30 causes the magnetic inductance of the coil to increase. As a result of the sudden increase in magnetic inductance from the closure of the axial air gap 54, the energization of the coil is insufficient to maintain its same current level, so the current dips temporarily while the energization of the coil adjusts to the increased magnetic inductance. Although the current waveform in FIG. 5(b) is shown in connection with the energization of the clutch coil 47 by a ramp voltage (FIG. 5a), the dip in the current level at the time of gap closure also occurs when the coil is energized by other energization techniques such as, for example, a step voltage.

In accordance with one important aspect of the invention, the energization of the clutch coil 47 is controlled to reduce the initial torque coupling and increase the initial slippage between the rotor 30 and armature 18 immediately after the closure of axial air gap 54 and in response to the sensing of the closure of the air gap. Preferably, the current though the clutch coil 47 is sensed by a peak detector feedback circuit which senses the dip in coil current at the time of gap closure. In response to detection of the current dip, the feedback circuit causes energization of the coil to be reduced. By providing a means for sensing the closure of the air gap between the rotor and armature, the reduction of coil energization can occur nearly simultaneously with gap closure throughout the useful life of the clutch.

Specifically, upon activation of the switch SW by the RPM sensor 101 in FIG. 6, the voltage $V_{BAT}$ from a battery source is applied to the clutch coil 47 until the coil current dips in response to the increased magnetic inductance resulting from the closure of the armature-rotor axial air gap 54. When the armature-rotor axial air gap 54 closes and the clutch coil's current dips in response, a current peak is detected and the energization of the clutch coil 47 by the volta $V_{BAT}$ is reduced so as to lower the average m.m.f. to an initial value which is preferably small enough to achieve maximum initial slippage between the armature 18 and rotor 30. But the initial average m.m.f. after the closure of the axial air gap 54 must be great enough to prevent the armature 18 from moving away from the rotor 30 and thereby reopening the air gap. By controlling the average current energization of the clutch coil 47 and the associated m.m.f., the torque coupling between the armature 18 and rotor 30 is also controlled; preferably the torque coupling increases over an approximately $2\frac{1}{2}$ to 3 seconds time period after switch closure, starting from a near zero torque coupling accompanied by 100% slippage to full torque coupling accompanied by zero slippage (i.e., rotor and armature in synchronous rotation).

By utilizing operational amplifiers in comparator, integrator, peak detector and current detector configurations, the circuit of FIG. 6 combines operational amplifiers with a R-S flip-flop and a sawtooth generator to deliver a voltage signal to the base of a Darlington transistor pair in series with the clutch coil 47 which controls the average current energization of the coil in accordance with the invention. In the FIG. 6 circuit configuration the NPN transistor T1 and Darlington transistor pair T2, T3 are either off or saturated; in other words, the transistors combine to act like a switch which controls the application of the voltage $V_{BAT}$ to the clutch coil 47.

The initial controlling of the transistors after the switch SW has been closed is provided by the active Q output of R-S flip-flop 103. The active Q output of the R-S flip-flop 103 operates to hold the Darlington transistor pair T2, and T3 fully on, which thereby applies the voltage $V_{BAT}$ to the clutch coil 47. When the axial air gap 54 closes, the dip in current through the clutch coil 47 is sensed by a current detector and peak detector comprising voltage amplifier 105 and operational amplifier 107, respectively. To reduce the energization of the clutch coil 47 after closure of the axial air gap 54, the current detector and peak detector reset the R-S flip-flop 103. Thereafter, the Darlington transistor pair T2, T3 is no longer held saturated by the R-S flip-flop 103; instead, the Darlington transistor pair is pulse-width modulated by operational amplifiers 109, 111 and 113 in cooperation with sawtooth generator 115. Initially, the duty cycle of the pulses are such that the average current through the coil is reduced to an amount that results in a near zero torque coupling and an 100% armature-rotor slippage. The duty cycle is controllably increased so as to bring the clutch to full torque and 0% slippage with minimum associated noise.

When engine speed rises above the value A (FIG. 3), the switch SW in FIG. 6 opens and the clutch coil 47 is thus de-energized. The inductive kick is dissipated by current flow through a flyback diode D1. When the engine speed falls below the value A in FIG. 3, the RPM sensor 101 energizes coil 117 which closes the switch SW to connect the battery voltage source $V_{BAT}$ to the circuit in FIG. 6. In order to supply a controlled voltage $V_{cc}$ to the components in FIG. 6, a voltage regulator 119 is provided. Initially, after the switch SW is closed the NPN transistor T1 is biased to an on condition thus biasing off the Darlington transistor pair T2, T3. Accordingly, when the switch SW is closed the clutch coil 47 initially remains de-energized.

In order to start the circuit into operation, the R-S flip-flop 103 receives at its set input a voltage from a resistor-capacitor charging circuit comprising series connected capacitor C1 and resistor R1. When switch SW is closed, at time $t_0$ in the timing diagrams of FIG. 7a and 7b, the voltage regulator 119 outputs a controlled supply voltage $V_{cc}$ (e.g. 8.2 volts) to capacitor C1 and resistor R1 and also to all other active components in FIG. 6. From timing diagram A in FIG. 7a it can be seen that the voltage at the set input of the R-S flip-flop 103 rises according to a time constant defined by the RC time constant of the series connected capacitor C1 and resistor R1. At time $t_1$ in FIG. 7a, the voltage at the set input of the R-S flip-flop 103 is sufficient to cause the Q output of the flip-flop to quickly rise from near zero volts to $V_{cc}$ volts. As more clearly explained hereinafter, the rising of the voltage at the Q output of the R-S flip-flop 103 to a voltage level of $V_{cc}$ is the beginning of an initial energization pulse to the clutch coil 47 which is terminated when the armature 18 is drawn into contact with the rotor 30.

Before the voltage signal from the Q output of the R-S flip-flop 103 is delivered to the other circuit elements in FIG. 6, it passes through a buffer circuit comprising inverter gate 121 and PNP transistor T4 biased by resistors R2 and R3. The buffer circuit isolates the R-S flip-flop 103 in order that the current requirement of the flip-flop is limited to that needed to drive the inverter gate 121 thus giving the overall circuit increased thermal stability.

During the time the Q output of the R-S flip-flop 103 is activated there exists at the negative input to the operational amplifier 113 a $V_{cc}$-level voltage from the flip-flop which holds the output of the amplifier at ground. The operational amplifier 113, in a comparator configuration, receives a sawtooth signal at its positive input from sawtooth generator 115 (timing diagram D in FIG. 7a) by way of a resistor 64; at its negative input it receives the buffered voltage output from the R-S flip-flop 103 (timing diagram B in FIG. 7a) by way of a resistor R5 and a diode D2. The operational amplifier 113 also receives at its negative input, by way of a resistor R6, the output voltage of an integrator-configured operational amplifier 111; as will be explained more fully hereinafter, the voltage from the operational amplifier 111 is of a lesser magnitude during time period P in FIG. 7a (between times $t_1$ and $t_2$) than the $V_{cc}$-level voltage from the R-S flip-flop 103 during the same time period. Accordingly, the voltage at the negative input of the operational amplifier 113 is at full voltage $V_{cc}$ during time period P (timing diagram C in FIG. 7a).

Since the peak voltage value of the output signal of the sawtooth generator 111 is less than or equal to a value of $V_{cc}$, the output of the operational amplifier 113 is held at a voltage close to ground for the duration of the $V_{cc}$ voltage pulse from the R-S flip-flop 103. During the time the output voltage of the operational amplifier 113 is near ground the voltage divider network composed of resistors R8 and R9 hold NPN transistor T1 in an off condition. In its off condition, the collector of the NPN transistor T1 is unbiased. This allows the resistor R10 to turn on the Darlington transistor pair T2, T3 which allows the voltage $V_{BAT}$ to initiate an inductive current in the clutch coil 47 as represented by the timing diagram F between the times $t_1$ and $t_2$. When the current reaches a point to create a sufficient flux coupling between the rotor 30 and armature 18 to draw the armature into contact with the rotor, the change in the clutch coil's magnetic inductance is sensed and the R-S flip-flop 103 is reset.

In order to reset the R-S flip-flop 103 and end the full-voltage energization of the clutch coil 47 by the voltage $V_{BAT}$, a feedback circuit comprising a current detector and a peak detector senses the increased magnetic inductance which occurs at the time the armature 18 is drawn into contact with the rotor 30. A current detector comprising a resistor R11 and the voltage amplifier 105 delivers to the peak detector a voltage signal proportional to the current in the clutch coil 47. In order to detect the closure of the axial air gap 54 between the rotor 30 and armature 18, the current detector's output is delivered to a peak detector comprising the operational amplifier 107. As explained above, when the armature-rotor axial air gap 54 is closed by the movement of the armature 18 into engagement with the rotor 30, the suddenly increased magnetic inductance causes a dip to occur in the waveform of the current through the clutch coil 47. By utilizing a peak detector in the feedback circuit, the dip in current is advantageously used to generate a signal indicating the time of rotor-armature gap closure.

In association with the current dip, there is also a current peak (i.e., where the current changes slope from increasing to decreasing); accordingly, the current detector's output signal waveform includes a voltage peak which is associated with the occurrence of the closure of the axial air gap 54. In order to detect this voltage peak, the signal to the positive input of the operational amplifier 107 is phase delayed with respect to the signal at its negative input. Specifically, the output from the current detector is delivered to the negative input of the operational amplifier 107 by way of series connected resistor R12 and diode D3; the positive input of the operational amplifier 119 receives the output of the current detector by way of a diode D4 and a charging circuit comprising a parallel-connected resistor R13 and capacitor C2. The capacitor-resistor charging circuit imposes a phase shift to the current detector's output signal delivered to the positive input of the operational amplifier 107. Because of the phase shifting, the dip in output voltage from the current detector—which corresponds to the dip in clutch coil current at the time of the closure of the axial air gap 54—will appear at the negative input of the operational amplifier 107 before it will appear at the positive input of the operational amplifier.

Since the voltage to the positive input of the operational amplifier 107 (timing diagram G in FIG. 7a) is phase shifted or phase delayed, a greater voltage is at the amplifier's negative input during the time period P of rising voltage from the current detector. Therefore, the voltage output of the operational amplifier 107 remains near ground throughout the time period P. When the dip in voltage from the current detector occurs at time $t_2$, the phase-delayed voltage to the positive input of the operational amplifier 107 (timing diagram G in FIG. 7a) becomes greater than the voltage to the negative input. In response to this change at the inputs of the operational amplifier 107, the output of the amplifier transits from near ground voltage to a voltage of $V_{cc}$. This transition resets the R-S flip-flop 103 to end the voltage pulse from the Q output of the flip-flop (timing diagram B in FIG. 7a).

Since the phase of the voltage at the negative input of the operational amplifier 107 leads the phase of the voltage to the positive input of the operational amplifier (timing diagram G in FIG. 7a), when the current begins to rise again (after the current in the clutch coil has adjusted to the sudden increase in magnetic inductance at the time of closure of the axial air gap 54) the negative input to the operational amplifier again has a more positive voltage input. In response to these changes at the inputs to the operational amplifier 107, the amplifier's output voltage returns to near ground voltage.

In order to accentuate that the length of the pulse P is variable (depending on the time of gap closure), timing diagram B in FIG. 7a illustrates the pulse P alternatively lasting until times $t_2$ or $t_{2a}$. For illustration, time $t_2$ can be thought of as representing the time of gap closure for a new electromagnetic coupling where the energizing members are not yet worn and the gap 54 is small; time $t_{2a}$ can represent the time of gap closure for an electromagnetic coupling close to the end of its useful life.

At the conclusion of the pulse P from the R-S flip-flop 103 at time $t_2$, the voltage from the integrator configured operational amplifier 111 is no longer "washed out" at the negative input of the operational amplifier 113 by the higher voltage level of the pulse from the flip-flop. During the time period P of the pulse from the R-S flip-flop 103, the operational amplifier 111 has been integrating the voltage at its positive input. After the pulse from the R-S flip-flop 103 is concluded and the air gap closed, the voltage from the integrator-configured operational amplifier 111 takes control of the voltage at the negative input of the operational amplifier 113. At time $t_2$ the output voltage of the operational amplifier 111 is equal to a voltage $V_3$ (timing diagram K in FIG. 7b). Since the sawtooth signal from the sawtooth generator 115 swings from approximately ground to a voltage level of $V_{cc}$, the output of comparator-configured operational amplifier 113 switches between a voltage level of $V_{cc}$ and ground at a frequency equal to that of the sawtooth signal and at a duty cycle proportional to the voltage from the integrating operational amplifier 111.

The buffered Q output of the R-S flip-flop 103 controls the voltage appearing at the integrating input (positive input) of the operational amplifier 111. Since the Q output of the R-S flip-flop 103 is delivered to the negative input of the operational amplifier 109 by way of the resistor R15, the active Q output causes the output of the operational amplifier 109 to be held at approximately ground voltage. Accordingly, the voltage at the center-tap wiper of resistor R23 is also ground. But the resistor R16 directly receives the pulse from the R-S flip-flop 103 so that it has a voltage $V_1$ at its center-tap wiper; therefore, the operational amplifier 111 integrates the voltage $V_1$ during time period P which it receives at its positive input from the center-tap wiper of resistor R16 by way of resistor R17, diode D5 and resistor R18.

Also at the conclusion of the pulse P from the R-S flip-flop 103 at time $t_2$, the output of the operational amplifier 109 changes from a near ground voltage to a voltage of $V_{cc}$ volts. This change occurs since the amplifier's negative input is no longer receiving a $V_{cc}$ level voltage from the R-S flip-flop 103 and the positive input of the operational amplifier is biased at a non-ground voltage by a voltage-divider network comprising resistors R20, R21 and R22. Also at the end of the pulse P from the R-S flip-flop 103 at time $t_2$, the voltage applied to resistor R16 falls to approximately ground voltage. But the resistor R23, which receives the output of the operational amplifier 109, now has a voltage $V_2$ at its center-tap wiper. From the center-tap wiper of the resistor R23, the voltage $V_2$ is received at the positive input of the operational amplifier 111 by way of resistors R24 and R18. Accordingly, the operational amplifier 111 integrates the voltage $V_1$ for the time period P and the voltage $V_2$ thereafter (timing diagram J in FIG. 7b).

Figure 7B:
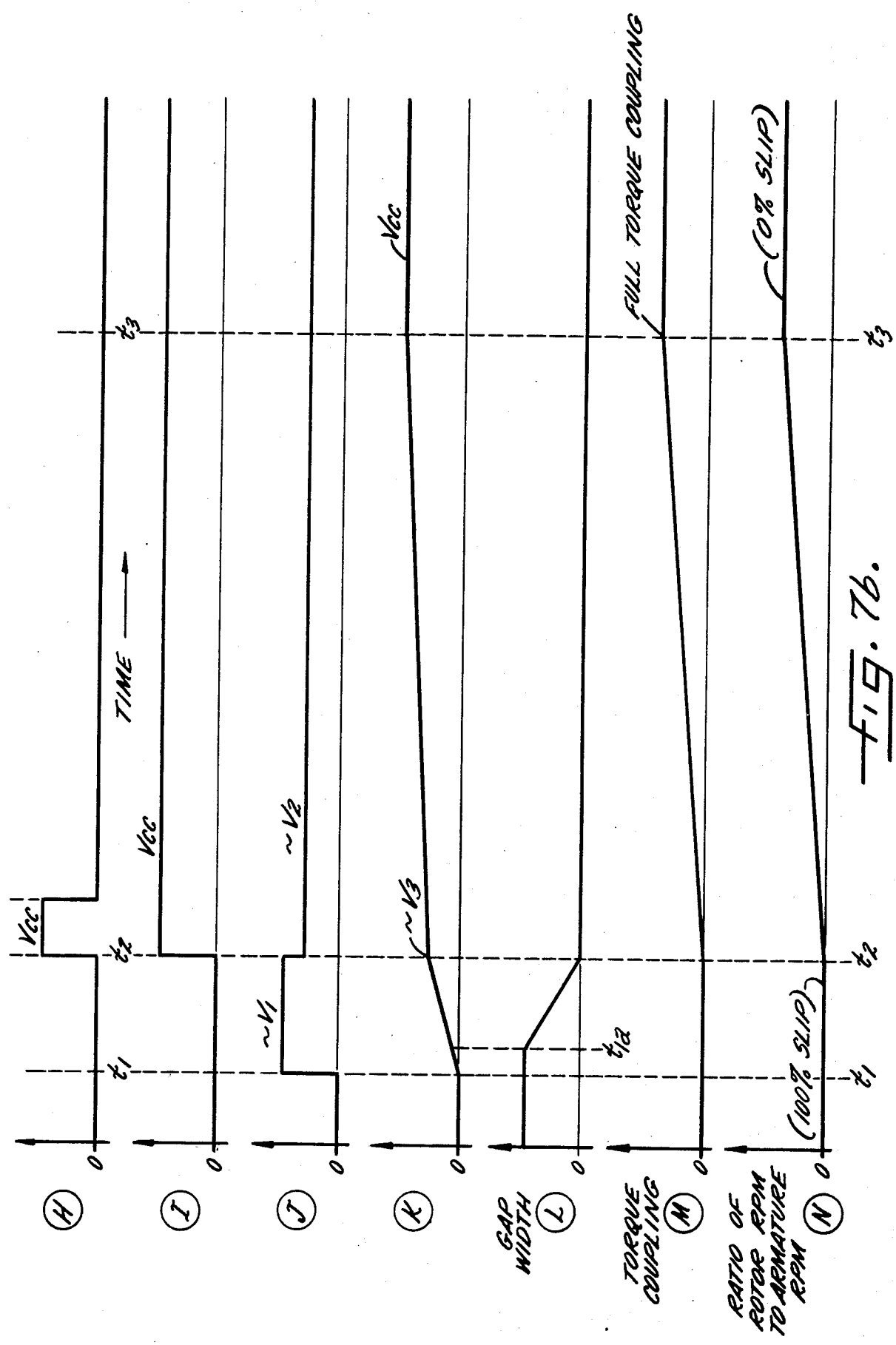
FIG. 7 is a timing diagram of the voltage and current waveforms associated with the clutch energization circuit in FIG. 6.

Since, in its integrator configuration, the operational amplifier 111 integrates the sequential voltages $V_1$ and $V_2$, the output voltage of the amplifier has a first slope during the time period P and a second slope thereafter (timing diagram K in FIG. 7b). By design, the voltage $V_1$ is selected to be greater than the voltage $V_2$, since the purpose of the voltage integration during the time period P is to achieve a predetermined energization level of the clutch coil at time $t_2$; whereas, the purpose of the voltage $V_2$ is to provide a steadily increasing energization of the clutch coil 47 from the predetermined energization state at time $t_2$ to full energization at a time $t_3$. The operational amplifier 111 integrates the voltages $V_1$ or $V_2$ by way of a conventional integrator configuration of capacitor C3 connected in a negative-feedback arrangement.

At the conclusion of the pulse from the R-S flip-flop 103 at time $t_2$, the armature 18 has been drawn into contact with the rotor 30; initially there is preferably 100% slippage and 0% torque coupling. As stated above, when the pulse from R-S flip-flop 103 ends at time $t_2$, the ramp voltage output of the operational amplifier 111 has reached a level $V_3$ in timing diagram K. Since the voltage $V_3$ is considerably less than the peak voltage value $V_{cc}$ of the sawtooth signals from sawtooth generator 115, the output of the operational amplifier 113 (timing diagram E) alternates between a voltage level of $V_{cc}$ and ground at the frequency of the sawtooth signal and at a duty cycle determined by the voltage from the operational amplifier 111; initially the voltage $V_3$ must be sufficient to create an average current in the clutch coil 47 which holds the armature 18 in contact with the rotor 30 but preferably allows for near 100% slippage and 0% torque coupling.

It should be noted that the relationship between the frequency of the sawtooth signal and the time period P in the timing diagrams of FIGS. 7a and 7b is only illustrative. Preferably the frequency of the sawtooth signal is approximately 400 Hz. The time period P of the pulse from the R-S flip-flop 103 is determined by the time of occurrence of gap closure between the rotor 30 and armature 18 but probably is greater than 0.06 seconds. In addition, the length of the time period $t_2$ to $t_3$ in relation to the time period $t_1$ to $t_2$ is greatly compressed in order that the full transistions of the various waveforms may be shown. Preferably, the time $t_3$, which marks full voltage, full current and full torque coupling, occurs at approximately 2½ to 3 seconds after switch closure.

In response to the alternating voltage at the output of the operation amplifier 113, the NPN transistor T1 is alternately turned on and off which alternately turns on and off the Darlington transistor pair T2, T3; in turn, the Darlington pair T2, T3 alternately energizes and de-energizes the clutch coil 47. From the timing diagrams C, D and E in FIG. 7a it will be appreciated by those skilled in the art of electronic circuit design that the increasing voltage from the operational amplifier 111 causes a decrease in the width of the pulses at the output of operational amplifier 113 (timing diagram E). Accordingly, as the voltage output of the operational amplifier 111 increases, the transistor T1 is held off for increasingly greater periods of time during each cycle of the sawtooth signal. As a result of the transistor T1 increasing its off-time duration, the Darlington pair T2, T3 increases its on-time duration and clutch coil 47 increases the time duration of its energized state.

As the ratio of on-time to off-time increases, the average current in the clutch coil 47 is controlled to substantially follow the current waveform in the timing diagram F of FIG. 7a. At time $t_3$ the clutch coil 47 is continuously energized and the average current has reached its full value; accordingly, at time $t_3$ the torque coupling between the rotor 30 and armature 18 has also reached full value and the rotor and armature are in synchronous rotation (0% slip).

As indicated by the timing diagram M, the gap between the rotor 30 and armature 18 is closed at time $t_2$. Although the coil 47 is first energized at time $t_1$, the armature 18 will not begin to move across the gap until time $t_{1a}$ in diagram M since sufficient m.m.f. must be available to overcome both the springs 50 (which hold the armature away from the rotor) and the inertia of the armature's mass.

By decreasing the average current energizing the clutch coil 47 at time $t_2$, the coupling torque in the timing diagram N starts at near zero and increases steadily in response to the increase in the average current energizing the coil. Similarily, the slip between the rotor 30 and armature 18 decreases from 100% to 0% as depicted by the timing diagram P in FIG. 7b; the diagram illustrates the change in time of the ratio between the rotor's RPM and the armature's RPM. It should be noted that the waveforms in timing diagrams M, N and P are not rigorous; they are idealized waveforms intended for illustrative purposes only.

Referring now to FIGS. 8 through 11, in addition to providing the controlled engagement of the clutch 11 with the energization circuit in FIG. 6, the invention further reduces the engagement noise of the clutch by providing an improved construction for the armature 18 and rotor 30. As discussed above, the circumferentially spaced flux gaps 43, 44 and 48 in the rotor 30 and armature 18, respectively, provide means for guiding the magnetic flux of the clutch coil 47 between the rotor 30 and the armature 18. Each of the rotor's flux gaps 43 and 44 comprises a plurality of arcuate slots 125 aligned in a circle whose center is coincident with the center of the rotor 30. While flux gap 43 is circumferentially spaced at a radial distance $r_1$ from the center of the rotor, the flux gap 44 is circumferentially spaced at a radial distance $r_2$ which is radially inwardly of the flux gap 43.

The circumferentially spaced flux gap 48 of the armature 18 is located at a radial distance $r_3$ from the armature's center; the distance $r_3$ is greater than the radial distance $r_2$ but less than the radial distance $r_1$. Since the circular rotor 30 and circular armature 18 are co-axial when assembled into the TSAD clutch 11 of FIG. 4, the armature's flux gap 48 is circumferentially aligned so as to occupy a radial position between the rotor's flux gaps 43 and 44. This alignment of the flux gaps causes the magnetic flux path 55 in FIG. 4 to zig-zag between the rotor 30 and armature 18 thereby improving the electromagnetic coupling between the rotor and armature. Although the slots 125 of the flux gaps 43, 44 and 48 are shown as through holes in FIGS. 8 through 11, they need not be limited to such a construction. It is important that the slots comprising the flux gaps 43, 44 and 48 be areas of high reluctance in order to direct the flux path as discussed in connection with FIG. 4. Although as described herein, the slots are merely holes in the disks of the armature 18 and rotor 30—i.e., air is the medium of high reluctance—the slots may be composed of any high reluctance, non-magnetic material (e.g, aluminum).

In order to reduce the wear and damage from engagement of the surfaces of the rotor 30 and armature 18, which might otherwise occur during rotor-armature slippage, two concentrically positioned, annular rings of conventional brake friction material 121 and 123 are secured to the surface of the armature. Two corresponding concentrically positioned, annular recessed areas on the surface of the armature 18 receive the conventional brake padding material 121 and 123. Preferably, the friction is bonded into the recessed areas by an appropriate adhesive.

Separating the slots 125 in each of the flux gaps is a bridge area comprising a portion of the rotor or armature surface; for example, in the armature's flux gap 48, bridge area 127 is repeated between each adjacent pair of slots 125. In addition to the bridge areas, the configuration of the slots 125 also define regions hereinafter referred to as segments; for example, in the armature 18 an inner segment 129 is approximately delineated in length by the arc angle of the slot 125 and in width by the radius $r_3$ of the flux gap 48 minus the radius $r_4$ of the armature's inner edge. An outer segment 131, associated with the same segment 125, is approximately defined in length by the arc angle of the slot 125 and in width by the radius $r_5$ of the armature's outer edge minus the radius $r_3$ of the flux gap 48. Similarly, each slot 125 in the armature 18 has associated with it inner and outer segments 129 and 131, respectively.

The configuration of the slots 125 in the rotor 30 also define inner and outer segments similar to those segments of the armature 18. In particular, in flux gap 44 the slots 125 define inner segments spaced radially inwardly of the flux gap's radius $r_2$. Outer segments are defined by the radial region between the radius $r_1$ of the flux gap 43 and the radius of the outer edge of rotor 30. Still another set of segments (middle segments) are defined by the intervening ring 46 between the flux gaps 43 and 44. For example, in flux gap 44 a slot 125 defines an inner segment 129 similar to the inner segments 129 in the armature 18; they have a length approximately equal to the arc length of the slot 125 and a width of approximately the radius $r_2$ of flux gap 44 minus the radius $r_4$ of the inner edge of the rotor. Also like the armature 18, the rotor 30 includes an outer segment 131 spaced between the outer edge of the rotor and the radius $r_1$ of the slot 125. Since the rotor 30 has two flux gaps 43 and 44, a middle segment 133, whose equivalent is not found on the armature 18, is defined by the region between the slots 125 of the two flux gaps 43 and 44.

Traditionally, the slots comprising the flux gaps of both the armature 18 and rotor 30 are spaced symmetrically about their circumferences. Since the rotor and armature are commonly cold-formed using a punch die, the symmetrical arrangement of the slots make the tooling of the die much less difficult and expensive. In such a symmetrical slot arrangement, the slot-associated bridge areas and segments are also symmetrical. It has been empirically determined that the bridge areas 127 and the segments 129, 131 and 133 vibrate at their natural frequencies during clutch engagement. In a symmetrical arrangement of the rotor and armature's slots, the bridge areas have the same dimensions and mass; therefore, they vibrate at virtually the same frequency $f_1$. For the same reasons, all of the segments associated with a particular flux gap vibrate at a common frequency; for example, since all the inner segments 129 are virtually identical in a symmetrical arrangement of slots 125, they each have natural frequencies close to a frequency $f_2$. Similarly, the outer segments 131 and the middle segments 133 have natural frequencies close to the frequencies $f_3$ and $f_4$, respectively. By virtue of the fact that the bridge areas 127 or any of the sets of segments 129, 131 and 133 vibrate close to a single frequency, the resulting acoustical sound from the bridge areas or any of the sets of segments is an amplification of the common tone generated by each individual bridge area or segment. Although the noise from a single bridge area or segment would probably not be noticeable, the sum of the noise from a plurality of vibrating bridge areas and segments is noticeable.

In accordance with another important aspect of the bnvention, the slots 125 of the rotor 30 and armature 18 are asymmetrically configured and spaced in each of the flux gaps 43, 44 and 48 so as to reduce the audible noise arising from the vibrations of the bridge areas 127 and segments 129, 131 and 133 upon engagement of the clutch. By circumferentially and asymmetrically spacing the slots 125 about both the rotor 30 and armature 18, the associated bridge areas 127 and segments 129, 131 and 133 are made of different masses and dimensions; accordingly, both the bridge areas and segments are characterized by different natural frequencies which, when the bridge areas and segments are excited by the frictional engagement of the rotor and armature, cause acoustic vibrations at as many discrete frequencies as there is individual bridge areas and segments. Because of the difference in the natural frequencies among the bridge areas 127 and among the segments 129, 131 and 133, the acoustic vibrations created by the bridge areas and segments experience phase cancellation instead of amplification which results in a substantially quieter rotor-armature engagement.

To provide additional reduction of the acoustical sounds created by engagement of the clutch 11, the rotor 30 preferably includes a ring 135 made of a vibration dampening material such as a rubber composition secured by glue to the rotor's outer edge. Also to further reduce a acoustical vibrations, the rotor 30 preferably includes an annular ring 137 also made of vibration dampening material and secured by glue to the back surface of the rotor. Both the rings 135 and 137 provide sound dampening for the rotor 30. Preferably they are constructed of one integral piece.

Alternatively or in addition to the asymmetrical circumferential alignment of the slots 125 comprising the flux gaps 43, 44 and 48, slots may be made of different radial widths as indicated by rotor slot 125a in FIG. 10, provided there is no overlap between the slots of flux gap 43 or 44 on the rotor 30 and flux gap 48 on the armature 18 since such an overlap would interfere with the rotor-armature flux coupling.

From the foregoing it will be appreciated that the invention provides an improved soft-engagement apparatus and method for a gap-type clutch or brake. Of course, such an electromagnetic coupling and the control unit of the present invention may be used in a variety of applications other than the two-speed accessory drive system illustrated. In particular, the improved soft-start engagement may be used in connection with the engagement of a compressor for an air conditioning unit; it also may be used in connection with engagement of tractor accessories such as a rotary blade for a mower assembly or a blower for a leaf cleaning assembly. Other alternative uses will be apparent to those skilled in the art of clutch usage.

I claim as my invention:

1. An apparatus for controlling the energization of the multiple-turn winding of an electromagnetic coupling having an armature and a rotor separated by an air gap, said apparatus comprising:
    an actuating means for actuating said electromagnetic coupling in response to a sensed condition;
    a first means responsive to said actuating means for initially controlling the energization of said winding to provide sufficient flux density between said armature and rotor and across said air gap so as to cause said armature and rotor to close the air gap between them;
    a second means responsive to the closure of said air gap between said armature and said rotor for causing said first means to end its control over the initial energization of said winding;
    a third means responsive to the end of the initial energization of said winding by said first means for controlling the energization of said winding at a level reduced from said initial energization; and
    a fourth means responsive to the end of the initial energization of said winding by said first means for gradually increasing the energization of said winding from said reduced level of energization established by said third means to full energization so as to increase the coupling torque and decrease the slippage between said armature and said rotor.

2. An apparatus as set forth in claim 1 wherein a switch in series with said winding is responsive to said first, third and fourth means to control the current through said winding.

3. An apparatus as set forth in claim 2 wherein said first means holds said switch closed and said third and fourth means alternately close and open said switch so as to control the average current through said winding.

4. An apparatus as set forth in claim 1 wherein said second means is responsive to the increased magnetic inductance of said winding resulting from the closure of said air gap.

5. An apparatus as set forth in claim 1 wherein said third means controls the energization of said winding to reduce it to a level which produces approximately zero torque coupling between the armature and rotor and 100% slippage between the armature and rotor.

6. An apparatus as set forth in claim 1 wherein said third means controls the current through said winding in order to reduce the energization of said winding after the closure of said air gap.

7. An apparatus as set forth in claim 6 wherein said fourth means controls the current through said winding so that it increases in time from an initial value equal to the current through said winding determined by said third means.

8. An electromagnetic coupling apparatus responsive to a stimulating signal, said apparatus comprising:
   a multiple-turn winding;
   first and second members normally separated by an air gap and rotatable relative to one another, said members being movable into engagement by closure of said gap;
   holding means for holding said members separated by said gap and disengaged when said winding is de-energized;
   magnetically permeable flux path means for producing, when the winding is excited, magnetic flux threading through said members and said gap to attract said members into torque-transmitting engagement;
   said first member having a disk-shaped portion composed of magnetic material for engaging with said second member, said disk-shaped portion including non-magnetic areas circumferentially and asymmetrically spaced in said disk-shaped portion;
   first means responsive to said stimulating signal for exciting said winding to create an average m.m.f. in said flux path means sufficient to attract said members into engagement by relative motion which closes said gap;
   second means for sensing the closure of said gap between said first and second members;
   third means responsive to said second means for reducing the m.m.f. in said flux path means to a level at which said members are retained in touching engagement but with a sufficiently low force that such members may rotatively slip without transmitting from one to the other the full torque for which the coupling is rated; and
   fourth means after said third means have acted for gradually increasing the average m.m.f. in said flux path upwardly from its reduced value to a predetermined value which causes said members to be magnetically attracted so as to produce rated torque transmission without relative slippage.

9. An apparatus as set forth in claim 8 wherein said second member has a disk-shaped portion composed of magnetic material for contacting said disk-shaped portion of said first member upon clutch engagement with said disk-shaped portion of said second member including non-magnetic areas circumferentially and asymmetrically spaced in said disk-shaped portion of said second member.

10. An apparatus as set forth in claim 8 wherein said non-magnetic areas define segments and bridge areas in the disk-shaped portions of said first and second members which are of different sizes and shapes.

11. An apparatus as set forth in claim 8 wherein said first member includes vibration dampening material on the outer circumferential edge of its disk-shaped portion and on the reverse side of the planar face of the disk-shaped portion which engages with said second member.

12. An electromagnetic clutch assembly for providing quiet engagement of said clutch comprising:
   a magnetic rotor rotatable about an axis and having a disk-shaped portion;
   a magnetic armature rotatable about said axis and having a disk-shaped portion for engagement with said disk-shaped portion of said rotor;
   means for reducing the audible noise resulting from the vibration of said rotor and armature upon clutch engagement including flux gaps in said rotor and armature which define segments and bridge areas in the disk-shaped portions of said rotor and armature wherein neither all of the said segments or all of said bridge areas on said armature or said rotor have the same resonant frequency.

13. An electromagnetic clutch assembly as set forth in claim 12 wherein said flux gaps are asymmetrically spaced slots positioned circumferentially about said rotor and armature.

14. An electromagnetic clutch assembly as set forth in claim 13 wherein said slots have non-uniform radial thicknesses.

15. An electromagnetic clutch assembly as set forth in claim 13 wherein said slots have non-uniform arcuate lengths as measured from said axis.

16. An electromagnetic clutch assembly as set forth in claim 12 wherein said segments and bridge areas are of different shapes and sizes.

17. A rotor for engaging an armature in an electromagnetic clutch comprising:
   a magnetic disk for rotation about an axis which is perpendicular to the plane of said disk;
   a series of non-magnetic areas in said disk of said rotor forming a flux gap in said disk;
   means for reducing the audible noise resulting from the vibration of said rotor upon engagement with said armature including segments and bridge areas defined by said non-magnetic areas wherein neither all of said segments or all of said bridge areas have the same resonant frequency.

18. A rotor as set forth in claim 17 wherein said non-magnetic areas are asymmetrically spaced slots circumferentially positioned about said disk of said rotor.

19. A rotor as set forth in claim 18 wherein said slots have non-uniform radial thicknesses as measured from said axis.

20. A rotor as set forth in claim 18 wherein said slots have non-uniform arcuate lengths as measure from said axis.

21. A rotor as set forth in claim 17 wherein said segments and bridge areas are of different sizes and shapes.

22. An armature for engaging a rotor in an electromagnetic clutch comprising:
   a magnetic disk for rotation about an axis perpendicular to the plane of said planar face;
   a series of non-magnetic areas in said disk of said armature forming a flux gap in said disk; and
   means for reducing the audible noise resulting from the vibration of said armature upon engagement with said rotor including segments and bridge areas defined by said non-magnetic areas wherein neither all of said segments or all of said bridge areas have the same resonant frequency.

23. An armature as set forth in claim 22 wherein said non-magnetic areas are asymmetrically spaced slots circumferentially positioned about said disk of said armature.

24. An armature as set forth in claim 23 wherein said slots have non-uniform radial thicknesses as measured from said axis.

25. An armature as set forth in claim 22 wherein said segments and bridge areas are of different sizes and shapes.

26. An apparatus for energizing the multiple-turn winding of an electromagnetic coupling having an armature and a rotor separated by an air gap, said apparatus comprising:
   a current control means for controlling the average current energizing said winding;
   a first means responsive to an actuation signal for controlling said current control means to allow unrestricted current energization of said winding;
   a second means for sensing the closure of said air gap between said armature and said rotor;
   a third means responsive to said second means for controlling said current control means so as to reduce the average current energization said winding; and
   a fourth means responsive to said second means for controlling said current control means so as to gradually increase the average current energizing said winding from the reduced average current set by said third means to full current.

27. An apparatus as set forth in claim 26 wherein said current control means is a switch in series connection with said winding.

28. An apparatus as set forth in claim 26 wherein said second means is responsive to the increased magnetic inductance of said winding resulting from the closure of the air gap between said rotor and said armature.

29. An apparatus as set forth in claim 27 wherein the switch of said current control means is held closed by said first means and is pulse-width modulated opened and closed by said third and fourth means.

30. An apparatus as set forth in claim 26 wherein said third means reduces the average current energization of said winding to a level which produces approximately zero torque coupling between the armature and rotor and 100% slippage between the armature and rotor.

31. An apparatus as set forth in claim 26 wherein said third means reduces the average current energizing said winding substantially at the instant of gap closure.

32. A method for energizing a multiple-turn winding of an electromagnetic clutch or brake, wherein the armature and rotor of the clutch or brake are separated by an air gap, said method comprising the steps of:
   energizing said winding so as to cause said armature to move across said gap and into contact with said rotor;
   sensing the armature closing into contact with the rotor;
   reducing the energization of said winding in response to the closure of said gap between said armature and rotor so as to decrease the torque coupling and increase the slippage between said armature and said rotor; and
   gradually increasing the energization of said winding to full energization, full torque coupling and no-slip contact between said armature and said rotor.

33. A method for energizing a multiple-turn winding of an electromagnetic clutch or brake as set forth in claim 32 wherein the closure of said air gap is sensed by an increase in the magnetic inductance of said winding.

34. A method for energizing a multiple-turn winding of an electromagnetic clutch or brake as set forth in claim 33 wherein after the increased magnetic inductance has been sensed the energization of said winding is reduced to a level of approxiximately zero torque coupling and 100% slippage.

35. A method for energizing a multiple-turn winding of an electromagnetic clutch or brake as set forth in claim 32 wherein in response to the closure of the air gap between said armature and said rotor the energization of said winding is reduced to provide approximately zero torque coupling and 100% slippage between said armature and rotor.

36. A method for energizing a multiple-turn winding of an electromagnetic clutch or brake as set forth in claim 32 wherein the sensing of the armature closing into contact with the rotor is accomplished by detecting a peak in the current through said winding.

37. An apparatus for controlling the energization of the multiple-turn winding of an electromagnetic coupling having first and second engaging members separated by a air gap, said apparatus comprising:
   energization means for energizing said winding;
   first means for sensing the closure of the air gap between said first and second members in response to the energization of said winding; and
   second means responsive to the detection of gap closure by said first means for adjusting the energization of said winding by said energization means.

38. A control unit to a stimulating signal for causing an electromagnetic coupling to engage, said coupling having:
   first and second members normally separated by an air gap and rotatable relative to one another, said members being movable into engagement by closure of the gap,
   spring means for normally holding said members separated by said gap and disengaged, and
   a multiple-turn winding and magnetically permeable flux path means for producing, when the winding is excited, magnetic flux threading through said members and gap to attract said members into torque-transmitting engagement,
   said control circuit comprising, in combination:
   (1) means responsive to said stimulating signal for exciting said winding to create an average m.m.f. in said flux path means sufficient to attract said members into engagement by relative motion which closes said gap,
   (2) means for sensing the closure of said gap between said first and second members,
   (3) means responsive to said means (2) for reducing the average m.m.f. in said flux path means to a level at which said members are retained in touching engagement but with a sufficiently low force that such members may rotatively slip without transmitting from one to the other the full torque for which the coupling is rated, and
   (4) means operative after said means (3) have acted for gradually increasing the average m.m.f. in said flux path upwardly from its reduced value to a predetermined value which causes said members to be magnetically attracted so as to produce rated torque transmission without relative slippage.

* * * * *